United States Patent [19]

Suzuki et al.

[11] Patent Number: 4,775,906
[45] Date of Patent: Oct. 4, 1988

[54] SPINDLE BEARING ASSEMBLY FOR A MAGNETIC DISK DRIVE

[75] Inventors: Masami Suzuki, Odawara; Hiroshi Nishida, Kanagawa; Tsuyoshi Takahashi; Mikio Higashi, both of Odawara, all of Japan

[73] Assignee: Hitachi, Ltd., Tokyo, Japan

[21] Appl. No.: 853,553

[22] Filed: Apr. 18, 1986

[30] Foreign Application Priority Data

Apr. 19, 1985 [JP] Japan ................................. 60-82683

[51] Int. Cl.$^4$ ............................................. G11B 5/012
[52] U.S. Cl. ..................................... 360/98; 360/133
[58] Field of Search ................................ 360/86, 97–99, 360/133, 135; 384/218, 535, 563, 581, 417, 624; 369/269; 310/90; 346/137

[56] References Cited

U.S. PATENT DOCUMENTS

| 1,639,684 | 8/1927 | Bott | 310/90 X |
| 2,606,947 | 8/1952 | Happe | 310/90 X |
| 3,009,748 | 11/1961 | Pitner | 384/581 |
| 4,672,487 | 6/1987 | Brand et al. | 360/97 |

FOREIGN PATENT DOCUMENTS

| 57-83720 | 5/1982 | Japan | 384/535 |
| 58-184318 | 10/1983 | Japan | 360/98 |
| 58-211016 | 12/1983 | Japan | 384/535 |
| 60-52953 | 3/1985 | Japan | 360/98 |
| 2102512 | 2/1983 | United Kingdom | 384/535 |

Primary Examiner—Stuart N. Hecker
Assistant Examiner—Benjamin E. Urcia
Attorney, Agent, or Firm—Fay, Sharpe, Beall, Fagan, Minnich & McKee

[57] ABSTRACT

A magnetic disk drive apparatus has a spindle holding mechanism for a spindle that supports a plurality of magnetic disks. The spindle is rotatably supported on a base by two bearings. Each bearing is pressed by a compressive coil spring to the base in the direction parallel with the plane of the magnetic disks and perpendicular to the axial direction of the spindle. Additionally, one of the bearings is affected with a pressing force in the axial direction of the spindle by another compressive coil spring. Therefore, even if the bearings have a thermal expansion coefficient different from that of the base, the thermal expansion can be absorbed by the compressive coil springs thereby preventing a generation of thermal stress between the parts. Consequently, deflection in relative position between the two bearings is prevented, and an inclination of the spindle is avoided.

12 Claims, 3 Drawing Sheets

SPINDLE BEARING ASSEMBLY FOR A MAGNETIC DISK DRIVE

BACKGROUND OF THE INVENTION (a) Field of the Invention

The present invention relates to a magnetic disk apparatus, more particularly to a magnetic disk drive apparatus having a housing equipped with a spindle for supporting a plurality of magnetic disks. The spindle holding mechanism supports the spindle in rotation and ensures precise alignment of the spindle within the housing.

(b) Related Art Statement

In a conventional magnetic disk apparatus, a spindle for fixedly supporting a plurality of magnetic disks is rotatably held on a base which is part of a housing. Such mechanism for holding a spindle is disclosed in, for example, Japanese Unexamined Patent Publication No. 58-184318. The mechanism for holding a spindle of this type is discussed hereinafter, with reference to FIGS. 1 to 4. FIGS. 1 and 2 are schematic section views showing a main portion of the spindle holding mechanism.

In FIGS. 1 and 2, a plurality of magnetic disks 1 are fixedly supported on a spindle 2, and the spindle 2 is rotatably supported on a base 4 through two bearings 3a and 3b which are disposed at the upward and downward positions of the spindle 2 respectively. The spindle 2 is adapted to be driven by an electric motor 8 composed of a rotor 8a fixed at one end of the spindle 2 and a stator 8b fixed to the base 4.

A holding member 5 is fixed on the periphery of the outer ring of the bearing 3b, and there is provided a compressive spring 6 for depressing the holding member 5 in the axial direction between the holding member 5 and the base 4 as shown in FIG. 1. A compressive spring 7 for pressing the holding member 5 in the radial direction, between the holding member 5 and the base 4, is provided as shown in FIG. 2.

In FIG. 2, as shown by a mark A, a compressive contact member 7a for transmitting the resilient force of the compressive spring 7 is arranged at the periphery of the holding member 5 to effect a surface contact, and the holding member 5 is formed such that a portion of the periphery of the holding member 5 can contact, in a form of substantially line contact, the inner wall of the base 4 as shown by marks B and C. The inner wall of the base 4 is formed in a cylindrical form, and further the periphery of the holding member 5 is formed such that the curvature of the periphery of the holding member 5 at the portion to which the compressive contact member 7a is in contact, is substantially equal to the curvature of the inner wall of the base 4, while the curvature at the periphery portion 5a between the line contact portions B and C is larger than the curvature of the inner wall at the portion opposite to the periphery portion 5a. Thus, the holding member 5 is pressed against the inner wall of the base 4 by the resilient force of the compressive spring 7.

On the other hand, the outer ring of the bearing 3b is depressed in the axial direction through the holding member 5 by the resilient force of the compressive spring 6 in the axial direction. This pressure affects the inner ring of the bearing 3a through the inner ring of the bearing 3b and the spindle 2, whereby both bearings 3a and 3b are affected with a thrust pre-load for relatively shifting the inner ring with respect to the outer ring in the axial direction. By this, both bearings 3a and 3b are mutually prevented from a radial deflection.

Furthermore, the outer ring of the bearing 3b is depressed in the radial direction through the holding member 5 by the resilient force due to the compressive spring 7 in the radial direction, whereby the bearing 3b is depressed against the base 4 thereby maintaining the rotational axis position of the spindle 2 in a constant position.

According to the magnetic disc apparatus equipped with the spindle holding mechanism mentioned above, in the case of thermal expansion being produced in each of the parts by a temperature differential within the housing due to motor head and heat from the high speed rotation of the magnetic disks, there is a possibility of generating a deterioration of precision in mutual position between the magnetic disks 1 and the base 4. To avoid such deterioration of the precision in position, the base 4 and the magnetic disks 1 are made of Aluminum thereby both having the same thermal expansion coefficient.

However, since the bearing 3a out of two bearings for supporting the spindle 2 with respect to the base 4 is fixed to the base 4, a thermal stress is undesirably generated between the base 4 and the outer ring of the bearing 3a on the basis of a difference in thermal expansion coefficient between the materials, i.e., normally steel or the like, composing the bearing 3a and the material, i.e. Aluminum, composing the base 4, thereby generating a deformation or distortion of the base 4 and the bearing 3a. If such deformation of the base 4 and the bearing 3a is generated, as schematically shown in FIGS. 3 and 4, a deviation ΔX, i.e. error, in mutual position is undesirably produced between the magnetic disks 1 and magnetic heads 10 mounted on a carriage 9 moving on the base 4. It is inevitable for the development of the magnetic disk apparatus to restrict the deviation ΔX in the mutual position between the magnetic head 10 and the magnetic disk 1, if possible, on the basis of the thermal stress mentioned above.

SUMMARY OF THE INVENTION

An object of the present invention is to provide a magnetic disk apparatus in which a deviation in mutual position between a magnetic disk and a magnetic head is minimized.

A further object of the present invention is to provide a magnetic disk apparatus in which a precision in position of a rotational axis for holding a magnetic disk is improved.

Still further object of the present invention is to provide a magnetic disk drive apparatus in which generation of thermal stress between a base and a bearing interplaced between a rotating spindle and the base is avoided, and an inclination of the rotational axis of the spindle is avoided.

Other and further objects, features and advantages of the present invention will be appear more fully from the following description.

An embodiment of a magnetic disk apparatus of the present invention will be described in detail hereinafter with reference to the accompanying drawings.

DESCRIPTION OF THE PREFERRED EMBODIMENTS

Figure 1:
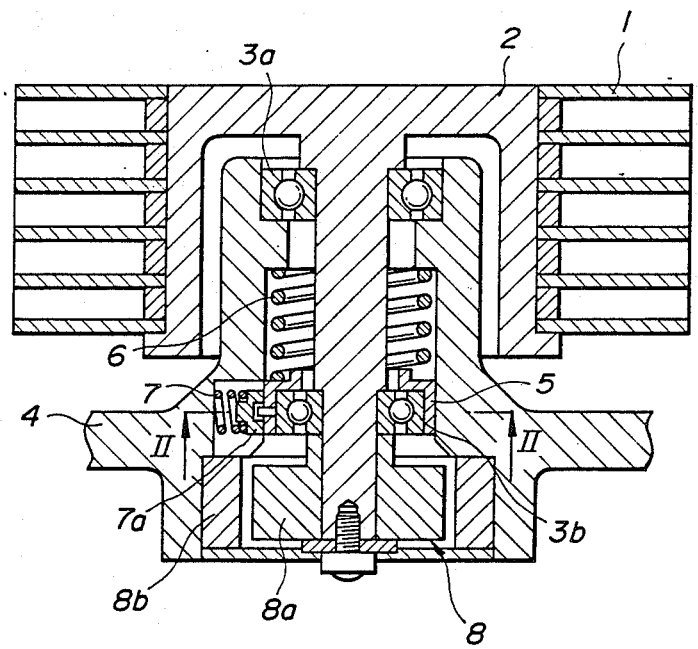
FIG. 1 is a sectional view showing a main part of a conventional magnetic disk apparatus.
Figure 2:
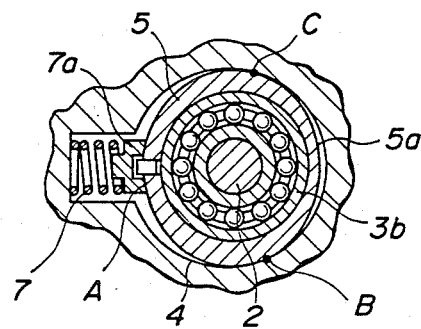
FIG. 2 is a sectional view taken along the line II—II in FIG. 1, FIGS. 3 and 4 are schematic views for explaining a problem due to a thermal stress in the conventional magnetic disk apparatus.
Figure 3:
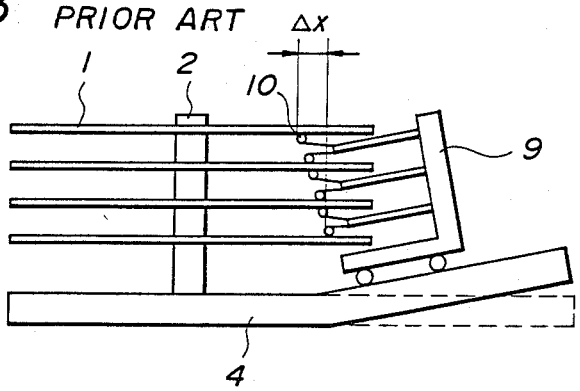
Figure 4:
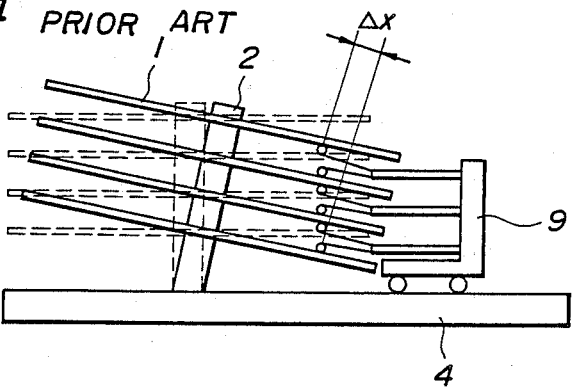
Figure 5:
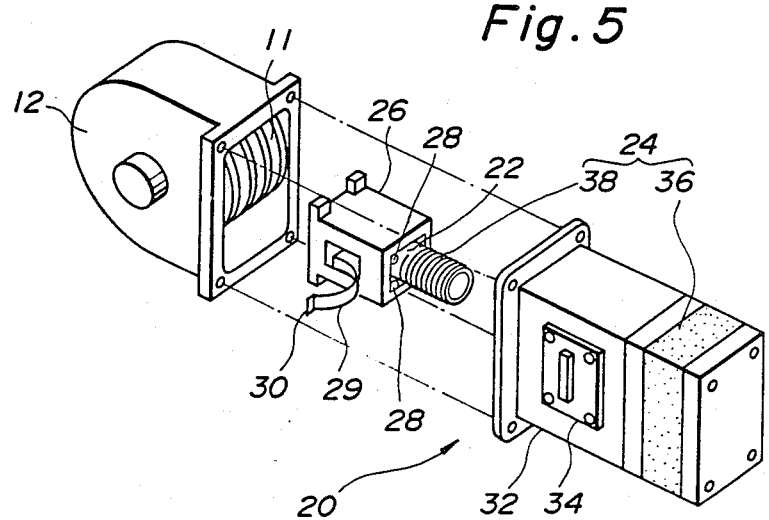
FIG. 5 is a schematic, partially exploded and perspective view of an embodiment of a magnetic disk apparatus of the present invention.

Referring to FIG. 5, an embodiment of a magnetic disk apparatus of the present invention is shown by using a schematic, partially exploded and perspective view. In the magnetic disk apparatus, a plurality of magnetic disks 11 in which data is written are fixedly supported on a spindle 14 rotatably mounted within a housing 12 mentioned hereinafter in detail. The spindle 14 is driven by an electric motor 15 having a rotor 58 fixed at the lower end of the spindle 14 and a stator 60 fixed on the housing 12. Though the magnetic head is not shown in the figure, an actuator 20 for moving the magnetic head in the radial direction on a recording surface of a magnetic disk 11, is mounted within the housing 12. The actuator 20 provides a carriage 22 for supporting the magnetic head and a voice coil motor 24 for driving the magnetic head. The carriage 22 supports the magnetic head through gimbals (not shown) by one end of the carriage 22, and mounted in such a manner that the carriage 22 can move along rails 28 arranged on a rail housing 26. The rail housing 26 is fixed on the housing 12 at one end of the rail housing 26 by bolts (not shown), and lead wires 29 pass through an opening on the side portion of the rail housing 26. The lead wires 29 are connected through a connector 30 to a base plate 34 mounted on a cylindrical supporter 32 to be fixed to the housing 12. The cylindrical supporter 32 is fixed at the side portion of the housing 12 through bolts (not shown) such that the rail housing 26 is completely received within the cylindrical supporter 32.

The voice coil motor 24 is composed of a magnet 36 fixed on the cylindrical supporter 32 and a coin 38 mounted on one end of the carriage 22 in a body and arranged in such a manner that the axis of the coil 38 is in parallel with the rails 28. If the coil 38 is supplied with an electric current, a magnetic circuit is formed by the coil 38 and the magnet 36, and the coil 38 is moved along the its axis.

In the actuator 20, if the voice coil motor 24 is driven, the coil is excited and the carriage 22 moves along the rails 28, 28. Therefore, the magnetic head is moved in the radial direction of the magnetic disk 11 thereby arranging the magnetic head in a desired position.

Figure 6:
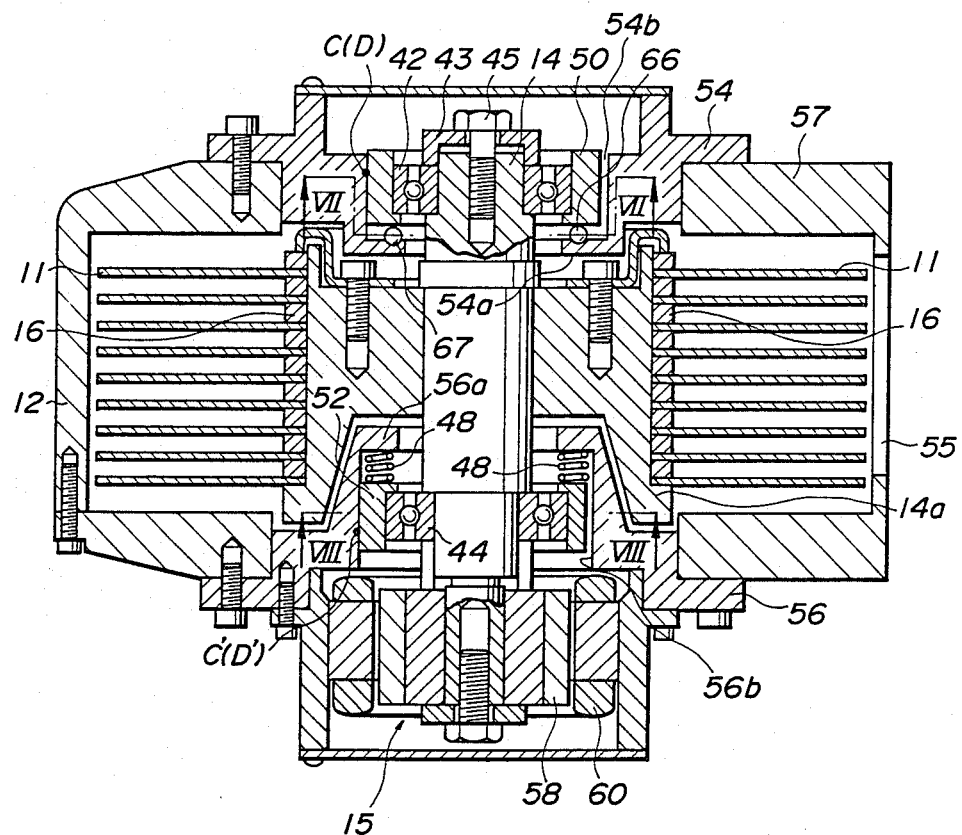
FIG. 6 is a sectional view of a main portion of the embodiment of FIG. 5.

Referring now to FIG. 6, the section of the main portion of the magnetic disk drive apparatus of the present invention is shown. For the sake of explanation, the housing 12 shown in FIG. 5 is shown in longitudinal sectional view. In the figure, a spindle holding mechanism for holding the spindle 14 is shown in detail. Numerals 42 and 44 denote upper and lower bearings respectively that are arranged in the horizontal direction in the state of FIG. 5. The spindle 14 is rotatably supported on an upper base portion 54 and a lower base portion 56, which are part of the housing 12, through the upper bearing 42 and the lower bearing 44 respectively. There is fixed a hub 14a at the periphery of the spindle 14, and a plurality of magnetic disks 11 are fixedly held at the peripheral surface of the hub 14a. The magnetic disks are spaced with a suitable gap in the axial direction by using spacers 16. Numeral 57 denotes a main base portion that is part of the housing 12, together with the upper and lower base portions 54 and 56, and the magnetic disks are received within the main base portion 57. There is provided an opening 55 at one side end of the main base portion 57 to pass the magnetic head mentioned above therethrough. The rail housing 26 and the supporter 32 which comprise the actuator 20, are fixed at the end of the opening 55. The upper and lower base portions 54 and 56 and the main base portion 57 are made of material such as Aluminum having a thermal expansion coefficient substantially equal to that of the magnetic disks 11.

The inner ring of the upper bearing 42 is fitted to a small-diameter portion provided at one end of the spindle 14 and fixed on the spindle 14 through a holder 43 by a bolt 45. On the other hand, the outer ring of the upper bearing 42 is fitted to an upper bearing housing 50 thereby being fixed. Similarly, the inner ring of the lower bearing 44 is fitted to a small-diameter portion provided at the other end of spindle 14, and the outer periphery of the outer ring of the lower bearing 44 is fitted to a lower bearing housing 52 thereby being fixed. The upper and lower bearing housings 50 and 52 are made of the same material as the upper and lower bearings 42 and 44 respectively.

Three balls 66 are disposed between the upper bearing housing 50 and a bottom wall 54a of the upper base 54 for stably supporting the upper bearing housing 50. Three balls 66 are rotatably disposed in three recess portions 67 provided on the bottom wall 50a. The upper bearing housing 50 is adapted to be movable within the region defined by the bottom wall 54a and a vertical wall 54b. The upper base portion 54 and the bottom wall 54a are formed in parallel with a plane perpendicular to the axial direction of the spindle 14, i.e. the plane of the magnetic disks 11.

Figure 7:
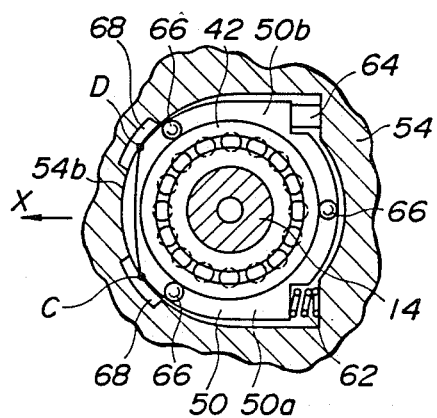
FIG. 7 is a sectional view taken along the line VII—VII in FIG. 6.

As shown in FIG. 7, the upper bearing housing 50 is symmetrical in formation, and in contact with vertical wall 54b of the upper base 54 at two points C and D which are located equi-distant from the axis of the spindle 14. There are provided two arm portions 50a and 50b on the upper bearing housing 50 at the positions corresponding to the points C and D respectively. A compressive coil spring 62 is disposed between the end portion of the arm portion 50a and the vertical wall 54b of the upper base 54a. A rod-like member 64 is disposed between the end portion of the other arm portion 50b and the vertical wall 54b of the upper base 54. The compressive coil spring 62 pushes the upper bearing housing 50 in the direction shown by the arrow X, therefore the upper bearing housing 50 is urged into contact with vertical wall 54b of the upper base 54 at the points C and D. On the other hand, the rod-like member acts as a stop for cancelling the moment produced by the resilient force of the compressive coil spring 62, the moment affecting the upper bearing housng 50. Therefore, the upper bearing housing is prevented from being rotated by the moment.

Thus, the upper bearing 42 is pressed against the vertical wall 54b of the upper base 54 through the upper bearing housing 50 by the resilient force of the compressive coil spring 62.

Figure 8:
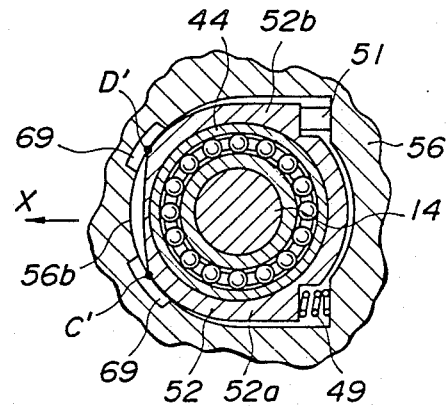
FIG. 8 is a sectional view taken along the line VIII—VIII in FIG. 6.

On the other hand, the lower bearing housing 52 is disposed within the region defined by the upper wall portion 56a of the upper base 56 and a vertical wall 56b. As shown in FIG. 8 the lower bearing housing 52 is symmetrical in formation similar to the upper bearing housing 50. The lower bearing housing 52 is in contact with the vertical wall 56b of the lower base 56 at two points C' and D', the points C' and D' being located equal-distantly from the axis of the spindle 14. There are provided two arm portions 52a and 52b in correspondence with the points C' and D' respectively, and a compressive coil spring 49 is disposed between the end of the arm portion 52a and the vertical wall 56b, and a further a rod-like member 51 is disposed between the end of the other arm portion 52b and the vertical wall 56b. The compressive coil spring 49 presses the lower bearing housing 52 in the direction shown by an arrow X against the vertical wall 56b of the lower base 56 at the points C' and D'. The rod-like member 51 acts as a stop to inhibit the rotation of the lower bearing housing 52 as mentioned above, with respective to the rod-like member 64.

Thus, the lower bearing 44 is pressed against the vertical wall 56b of the lower base 56 through the lower housing 52 by the resilient force of the compressive coil spring 49. The direction of the pressing is the same as that of the upper bearing 42.

As mentioned above, a pre-load mechanism in the radial direction with respect to the upper bearing 42 is constituted by the upper bearing housing 50, the compressive coil spring 62, and the rod-like member 64. A pre-load mechanism in the radial direction with respect to the lower bearing 44 is constituted by the lower bearing housing 52, the compressive coil spring 49 and the rod-like member 51. The pre-load mechanisms are formed in the same size and the same formation. Furthermore, each element composing each radial pre-load mechanism with respect to each of the upper and lower bearings 42 and 44, is disposed in an overlapped positional relationship or in superposition with respect to the axial direction of the spindle 14, whereby the rotation axis of the spindle 14 is maintained in a constant position with respect to the base members of the housing. Numerals 68, 69 denote collars embedded on the vertical walls 54b and 56b of the upper and lower bases 54 and 56 respectively. The collars are adapted for contact with the upper and lower bearing housings 50 and 52 respectively. Each collar is made of steel material thereby preventing the wear of vertical walls 54b and 56b.

Numeral 48 denotes a compressive coil spring disposed between the upper wall 56a of the lower base 56 and the lower bearing housing 52. This compressive coil spring 48 presses the lower bearing housing 52 in the axial direction of the spindle 14, thereby forming the thrust pre-load mechanism. By the resilient force of the compressive coil spring 48, the outer ring of the lower bearing 44 is pressed through the lower bearing housing 52 in the downward direction, and the pressing force is transmitted to the outer ring of the upper bearing 42 through the spindle 14 and the inner ring of the upper bearing 42 and the balls. By this transmission of the pressing force, the outer and inner rings of the upper and lower bearings 42 and 44 are affected with the force for shifting them in the axial direction, thereby avoiding the radial deflection of the spindle 14.

According to the magnetic disk apparatus of the present invention, the housing 12 is composed of the main base 57, formed so as to receive the plurality of the magnetic disks 11, and the upper and lower bases 54 and 56 having central openings through which the spindle 14 can be inserted. These parts are connected with each other by using bolts, and further the upper and lower bases 54 and 56 are constituted in synchronism with the axis of the spindle 14. Furthermore, the upper and lower bearings 42 and 44 are disposed at the outside position of the openings of the upper and lower bases 54 and 56 respectively. This reduces the heating of the upper and lower bearings 42 and 44 caused by the heat from the high revolution of the magnetic disks 11 in the housing 12.

According to the magnetic disk apparatus of the present invention, even if thermal expansion occurs in the base and the upper and lower bearings by heat radiation, for example, from the motor, and thermal stress is not produced between these parts.

For example, with respect to the upper bearing 42 the upper bearing housing 50, fixed on the periphery of the upper bearing 42, is pressed to the vertical wall 54b of the upper base 54 at two points, by means of the compressive coil spring 62 and the rod-like member 64. Therefore the thermal expansion produced at the upper base 54 and upper bearing 42 can be absorbed thereby preventing an occurrence of thermal stress between these parts. Furthermore, even if the thermal expansion coefficient of the upper base is different from that of the upper bearing, the deformation produced can be prevented.

Furthermore, also with respect to the lower bearing 44, the thermal expansion produced between the lower bearing 44 and the lower base 56 can be prevented similarly.

According to the magnetic disk apparatus of the present invention, the upper and lower bearing housings 50 and 52 are respectively pressed to the vertical walls 54b and 56b of the upper and lower bases 54 and 56 in the same direction by the compressive coil springs 62 and 49 respectively. Therefore even if thermal expansion is produced between the upper bearing 42 and the upper base 54, and between the lower bearing 44 and the lower base 56 respectively, the center position of each of the upper and lower bearings 42 and 44 is not changed relative to each other, thus preventing an inclination of the spindle 14.

As mentioned above, the deviation of the relative position between the magnetic disk 11 an the magnetic head can be restricted to a very minute value thereby eliminating a misregistration error of the magnetic head and providing a magnetic disk drive apparatus for a magnetic disk with high density.

In the explanation of FIG. 6 mentioned above, the spindle 14 is arranged in a vertical direction for the sake of explanation, however the spindle 14 may be arranged in a horizontal direction. In the horizontal arrangement, the direction in which each of the compressive coil springs 62 and 49 press each of the upper and lower bearing housings 50 and 52, is desirably in the downward direction.

What is claimed is:

1. A magnetic disk drive apparatus including a plurality of magnetic disks and a spindle for fixedly holding the plurality of magnetic disks, first and second bearings spaced apart from each other in the axial direction of said spindle for rotatably supporting each spindle, each of said bearings having a center position, a base made of a material having a thermal expansion coefficient different from that of said first and second bearings, and a housing for receiving said magnetic disks; said magnetic disk drive apparatus comprising:

first radial pre-load means disposed between said first bearing and said base for pressing said first bearing in a direction substantially perpendicular to the axial direction of said spindle;

second radial pre-load means disposed between said second bearing and said base for pressing said second bearing in a direction substantially perpendicular to the axial direction of said spindle;

said first and said second radial pre-load means including means for resiliently absorbing thermal stress caused by a difference in thermal expansion between said base and said bearings respectively as a result of said different coefficients of thermal expansion between said materials of said base and said bearings respectively; and thrust pre-load means disposed between said base and one of said first and said second bearings for pressing said one of said first and said second bearings in the axial direction of said spindle, whereby the direction in which said first bearing is pressed by said first radial pre-load means is substantially the same as the direction in which said second bearing is pressed by said second radial pre-load means such that the center position of each of said bearings is unchanged relative to one another due to thermal expansion of the bearings and base and an inclination of the spindle is minimized.

2. A magnetic disk drive apparatus according to claim 1, wherein said first and second radial pre-load means further include first and second holding means for fixedly holding said first and said second bearings, and first and second spring means for resiliently connecting said first and second holding means to said base, whereby said first and second spring means press said first and second holding means respectively against said base in substantially the same direction for making a portion of said first and second holding means contact said base.

3. A magnetic disk drive apparatus according to claim 2, wherein said first and second spring means press said corresponding first and second holding means in the direction substantially perpendicular to the axial direction of said spindle, and said thrust preload means includes third spring means in contact with said second holding means and said base.

4. A magnetic disk drive apparatus according to claim 2, wherein said first radial pre-load means includes rotatable body means disposed between said first holding means and a planar wall portion of said base extending in a plane substantially parallel with the surface of said magnetic disk for movably supporting said first holding means on said planar portion.

5. A magnetic disk drive apparatus according to claim 3, wherein said first and second holding means are respectively contacted at two points by said base, each of said two points being located in the same distance from the center of said spindle.

6. A magnetic disk drive apparatus according to claim 4, wherein said rotatable body means is disposed within three recess portions provided on said planar portion thereby movably supporting said first holding means, each of said recess portions being located the same distance from the center of said spindle.

7. A magnetic disk drive apparatus according to claim 5, wherein said first and second holding means include respectively first and second bearing housings each having two arm portions corresponding to the two contact points respectively, one of said arm portions of each said bearing housing being pressed by the corresponding spring means, and the other of said arm portions being connected to one end of a rod-like member having its other end fixed to said base for preventing the rotation of each of said bearing housing.

8. A magnetic disk drive apparatus according to claim 7, wherein said first and second means have the same size and the same formation, and said first and second means are disposed in superposition with respect to the axial direction of said spindle.

9. A magnetic disk drive apparatus according to claim 7 further comprising said base having a collar for each of said bearing housings made of steel material and located where said first and second bearing housings contact said base.

10. A magnetic disk drive apparatus comprising a spindle fixedly holding a plurality of magnetic disks, a base having an inner space for receiving said magnetic disks and provided with upper and lower openings each of which is positioned opposite said inner space and through which said spindle can be inserted, upper and lower bearings rotatably supporting said spindle positioned outside said openings of said base respectively, first and second means respectively for fixedly holding said upper and lower bearings and for providing a radial pre-load to said upper and lower bearings by respectively pressing said upper and lower bearing housings in a direction substantially perpendicular to the axial direction of said spindle against said base, rotatable body means disposed between said upper bearing housing and a bottom wall portion of said base for movably supporting said upper bearing housing such that said upper bearing is movable on said bottom wall portion, said bottom wall portion extending in a plane substantially parallel to the surface of said magnetic disks, the thrust pre-load means disposed between said base and said lower bearing housing for pressing said lower bearing housing in the axial direction of said spindle, wherein said base includes vertical wall portions for respectively contacting a portion of each of said upper and lower bearing housings, each said vertical wall portion of said base being located at each outside portion of said two openings, whereby the direction in which said first means presses said upper bearing housing is substantially the same as the direction in which said second means presses said lower bearing housing.

11. A magnetic disk apparatus according to claim 10, wherein said upper and lower bearing housings respectively have a pair of arm portions for contacting each of said vertical walls at two positions, one of said paired arm portions being pressed by one end of a compressive coil spring, the other end of which is fixed to a wall portion of said base opposite to said corresponding vertical wall of said base, the other of said paired arm portions being connected to one end of a rod-like member, the other end of which is fixed to a wall portion at said base opposite to said corresponding vertical wall of said base, each said upper and lower bearing housing, each compressive coil spring and each rod-like member being constituted in the same size and in the same formation with respect to each other, and said first means being disposed with respect to said second means in superposition with respect to the axial direction of said spindle.

12. A magnetic disk apparatus according to claim 11, wherein said base has a main base portion having a side opening for receiving said magnetic disks, and further has upper and lower base portions each respectively having one of said openings and one of said vertical wall portions to which the corresponding bearing housing is in contact, and further said upper and lower base portions being respectively formed symmetrically with respect to the axis of said spindle.

* * * * *